United States Patent [19]
Britt, Jr.

[11] Patent Number: 6,141,678
[45] Date of Patent: Oct. 31, 2000

[54] PRESENTING INFORMATION RELATING TO A PROGRAM BY RECOGNIZING TEXT IN CLOSED CAPTIONING DATA

[75] Inventor: Joe F. Britt, Jr., Saratoga, Calif.

[73] Assignee: WebTV Networks, Inc., Mountain View, Calif.

[21] Appl. No.: 09/069,322

[22] Filed: Apr. 29, 1998

[51] Int. Cl.[7] .............................. G06F 15/16; G06F 3/00
[52] U.S. Cl. ......................... 709/200; 709/203; 345/327
[58] Field of Search .................................. 709/200, 203; 348/6, 8, 13; 346/6; 345/327

[56] References Cited

U.S. PATENT DOCUMENTS

| | | | |
|---|---|---|---|
| 5,319,453 | 6/1994 | Copriviza et al. | 348/6 |
| 5,748,736 | 5/1998 | Mitta | 348/13 |
| 5,889,950 | 3/1999 | Kuzma | 709/218 |
| 5,892,536 | 4/1999 | Logan et al. | 348/13 |
| 6,002,852 | 12/1999 | Birdwell et al. | 709/203 |
| 6,005,561 | 12/1999 | Hawkins et al. | 345/327 |

*Primary Examiner*—Krisna Lim
*Attorney, Agent, or Firm*—Workman, Nydegger, Seeley

[57] ABSTRACT

Presenting to a viewer additional information corresponding to a television program by recognizing key text data included in closed captioning is disclosed. A client computer that is capable of displaying television programming to a viewer and retrieving information from the Internet or from another network receives broadcast data including a program and closed captioning data. The client computer accesses a list of key text data having entries, each of which includes key text that is included in the closed captioning data of a particular program and that is distinctive to the program. The entries in the list of key text data further include instructions enabling the client computer to retrieve the additional information corresponding to the programs. The client computer decodes the closed captioning data and compares it to the key text data entries. When a match is identified, the client computer system executes the instructions included in the entry that has been matched. The instructions typically result in a viewer-selectable link being displayed on the display device. When the viewer selects the link, the client computer retrieves the additional information from a remote server computer and displays the additional information to the viewer.

19 Claims, 6 Drawing Sheets

PRESENTING INFORMATION RELATING TO A PROGRAM BY RECOGNIZING TEXT IN CLOSED CAPTIONING DATA

FIELD OF THE INVENTION

The present invention relates to the field of entertainment systems. More specifically, the present invention relates to a method and apparatus for analyzing the content of broadcast data viewed on an entertainment system for an appropriate time to deliver additional data to a viewer of the broadcast data.

BACKGROUND OF THE INVENTION

Television has become a key element in the advertising program for many companies. Billions of dollars are invested in communicating a product message that lasts only a few seconds to the viewing audience. The Internet and the World-Wide-Web have also become a source of advertising for many companies. The Web has become a vast repository of information available in various formats. The formats include simple text, audio, graphics, and video; these are also known as Multiple Internet Mail Extension (MIME) formats. The Web is attractive to businesses because it enables them to reach a large audience and create an impressive presence. Often, the information companies present on the Web can be much more in-depth than that which can be presented in a television commercial.

With the current trend in the electronics and computer industry to converge the computer system and more traditional entertainment system components such as the television, it is possible to combine displaying broadcast data with data from a computer system. This possibility could provide businesses with the opportunity to deliver additional information about themselves and their products during a broadcast of their advertisement. Thus, a method and apparatus for determining an appropriate time to deliver specific Web or Web-like content to an entertainment system using the existing infrastructure in broadcast transmission is desired.

SUMMARY OF THE INVENTION

A method for managing broadcast data according to a first embodiment of the present invention is disclosed. Closed captioning data is retrieved from the broadcast data. It is determined whether the closed captioning data matches key text data.

An apparatus according to a second embodiment of the present invention is disclosed. The apparatus includes a video decoder that decodes closed captioning data from broadcast data. The apparatus also includes a text analyzer that compares the closed captioning data with key text data and that generates a signal when a match is found.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
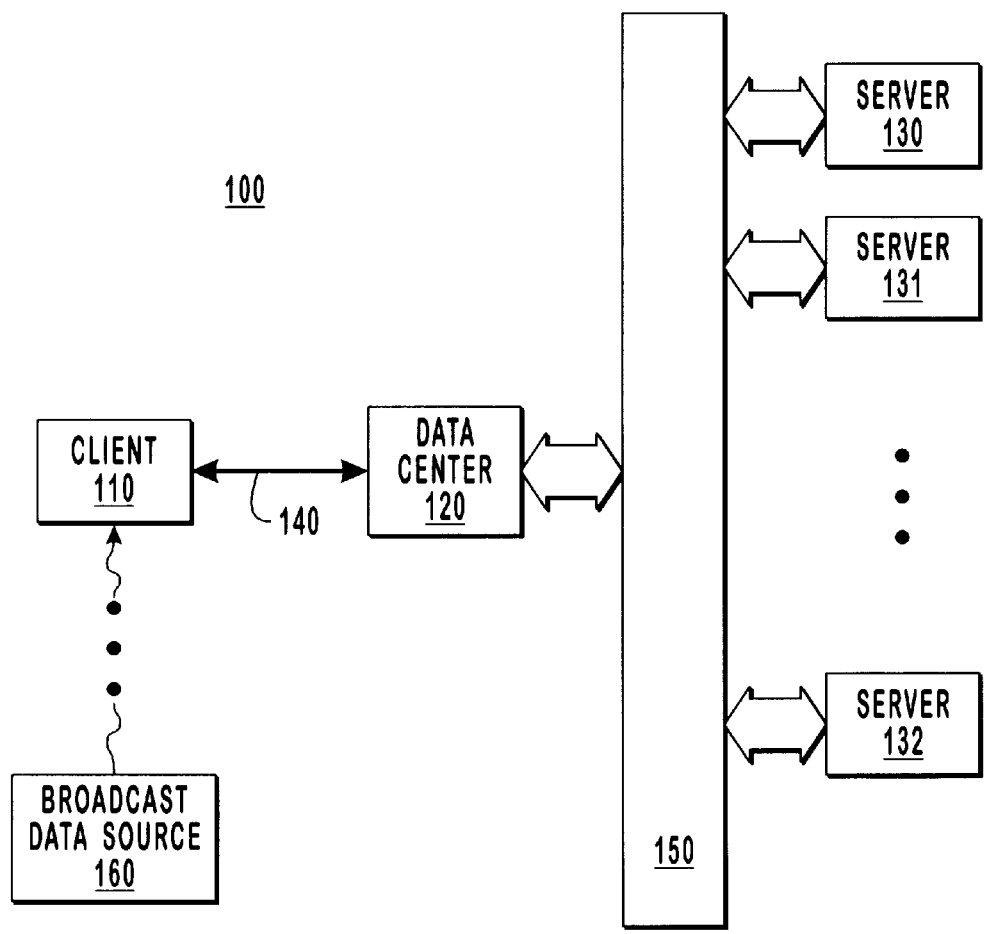
FIG. 1 is a block diagram of a network in which an embodiment of the invention is implemented.

FIG. 1 illustrates a network 100 in which an embodiment of the present invention is implemented. Block 150 represents the Internet. Blocks 130–132 represent server computer systems connected to the Internet 150. According to an embodiment of the present invention, each of the server computer systems 130–132 is a HyperText Transfer Protocol (HTTP) server that stores HTML files. Each of the server computer system 130–132 has an Internet domain name. The server computer system 130–132 include HTML files that have a URL that includes the file's name, preceded by the hierarchy of directory names in which the file is stored, the Internet domain name of the server that hosts the file, and the software and manner by which the browser and the document's host server communicate to exchange the file.

Block 110 represents a client computer system. The client computer system 110 is a convergent computer system that allows a user to view both broadcast data and data from a computer system off of a single display device.

Block 160 represents a broadcast data source. The broadcast data source 160 operates to transmit broadcast data to the client computer system 100. Broadcast data may be transmitted from the broadcast data source 160 to the client computer system via a cable broadcast, satellite broadcast, very high frequency (VHF) or ultra high frequency (UHF) communication from an aerial antenna, or using other transmission techniques.

Block 120 represents a data center. The data center 120 is connected to the Internet 150 and operates to facilitate a connection between the client computer system 110 and the Internet 150 such that the client computer system 110 may access the HTML files stored in the server computer systems 130–132. Data is passed between the client computer system 110 and the server computer systems 130–132 through the data center 120. The client computer system 110 interfaces the data center 120 via an intermediate connection 140. According to one embodiment of the present invention, the intermediate connection 140 may be a direct telephone connection to the data center 120. According to a second embodiment of the present invention, the intermediate connection 140 may be an indirect connection to the data center 120 via a direct telephone connection to a Post Office Protocol (POP) server that interfaces the data center 120.

Figure 2:
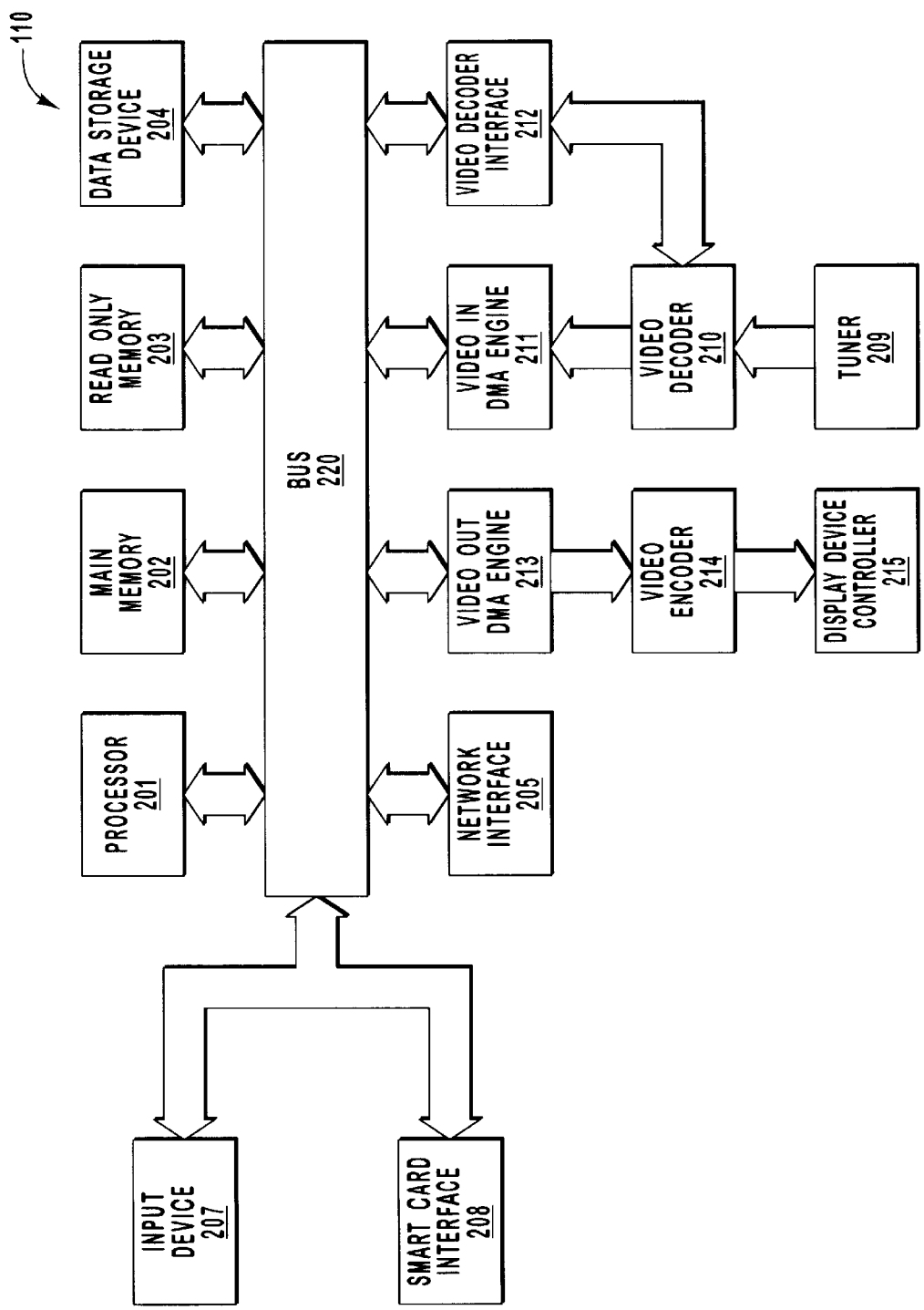
FIG. 2 is a block diagram of a client computer system in which an embodiment of the invention is implemented.

Referring to FIG. 2, a client computer system upon which an embodiment of the present invention can be implemented is shown as 110. The client computer system 110 comprises a processor 201 that processes digital data. The processor 201 may be a complex instruction set computing (CISC) microprocessor, a reduced instruction set computing (RISC) microprocessor, a very long instruction word (VLIW) microprocessor, a processor implementing a combination of instruction sets, a microcontroller, or other processor device. The processor 201 may be a single processor device or a plurality of processing devices. The processor 201 is coupled to a bus 220 which transmits data signals between the processor 201 and other components in the computer system 110. The bus 220 may be a single bus or a plurality of buses.

A main memory 202 is coupled to the bus 220 and may comprise a dynamic random access memory (DRAM) device, a static random access memory (SRAM) device, or other memory devices. The main memory 202 stores information or other intermediate data executed by the processor 201. The client computer system 110 also comprises a read only memory (ROM) and/or other static storage device 203 coupled to the bus 220 that stores information and instructions for the processor 201.

A data storage device 204 is coupled to the bus 220 and stores information and instructions. The data storage device 204 may be a hard disk drive, a floppy disk drive, a CD-ROM device, a flash memory device or other mass storage device. A network interface 205 is coupled to the bus 220. The network interface 205 operates to connect the client computer system 110 to a network. According to an embodiment of the present invention, the network interface 205 is a modem that connects the client computer system 110 to the intermediate connection 140 (shown in FIG. 1).

An input device 207, including alphanumeric and other keys, is typically coupled to the bus 220 for communicating information and command selections to the processor 201. In an alternate embodiment of the present invention the input device 207 is not directly coupled to the bus 220, but interfaces with the computer system 110 via infra-red coded signals transmitted from the input device to a infra-red receiver in the computer system (not shown). In still an alternate embodiment of the present invention, the input device 207 is a remote control unit having keys that select characters or command selections on the display device.

A smart card interface 208 is coupled to the bus 220. According to an embodiment of the present invention, the smart card interface 208 may operate to read or write to a smart card. The smart card interface 208 includes a sensor that detects when a smart card has been inserted in the smart card interface 208. The smart card interface 208 may be used to communicate with a contact or contactless smart card.

The client computer system 110 includes a tuner 209. The tuner 209 operates to receive broadcast data from the broadcast data source 160. The tuner 209 may include a cable tuner, a satellite tuner, a VHF/UHF tuner, or other broadcast data receiving devices. The tuner is coupled to a video decoder 210. In an embodiment of the client computer system 110 where the tuner 209 receives analog broadcast data, the video decoder 210 operates to decode the twenty-first line of the VBI in analog broadcast data into closed captioning data in ASCII text and digitizes the analog broadcast data. In an embodiment of the client computer system 10 where the tuner 209 receives digital broadcast data, the video decoder 210 operates to retrieve a channel in the digital broadcast that contains the closed captioning data. Closed captioning data is transmitted simultaneously with a program and provides a textual script of the dialog in the program in real-time. According to an alternate embodiment of the client computer system 110, the closed captioning data may be decoded by a component other than the video decoder 210.

A video decoder interface 212 is coupled to the video decoder 210. The video decoder interface 212 operates as a serial interface to retrieve the closed captioning data from the video decoder 210. A video in direct memory access (DMA) engine 211 is also coupled to the video decoder 210. The video in DMA engine 211 operates to coordinate movement of the digitized broadcast data from the video decoder 210 to components in the client computer system 110 via the bus 220. The video in DMA engine 211 allows the digitized broadcast data to be transmitted to components in the client computer system 110 at a fast rate without requiring intervention from the processor 201.

A video out DMA engine 213 is coupled to the bus 220. The video out DMA engine 213 operates to coordinate movement of the digitized broadcast data from components in the client computer system 110 to a video encoder 214. The digitized broadcast data may include modification or additions made to it from the components in the client computer system 110 such as the processor 201. The video out DMA engine 213 allows the digitized broadcast data to be transmitted from components in the client computer system 110 to the video encoder 214 at a fast rate without requiring intervention from the processor 201. The video encoder 214 is coupled to the video out DMA engine 213. The video encoder 214 operates to format the digitized broadcast data into a form that can be viewed by a display device. According to an embodiment of the present invention where the display device is configured to view analog broadcast data, the video encoder 214 operates to format the digitized broadcast data into an analog format.

A display device controller 215 is coupled to the video encoder 214. The display device controller 215 allows coupling of a display device to the client computer system 110 and operates to interface the display device to the client computer system 110. The display device (not shown) can be a television set, a computer monitor, a flat panel display or other display device. The display device receives broadcast data from the video encoder 214 through the display device controller 215 and displays the information and data to the user of the client computer system 110.

The present invention is related to the use of the client computer system 110 to analyze the content of broadcast data viewed on the client computer system 110. According to one embodiment, analyzing the content of broadcast data is performed by the client computer system 110 in response to the processor 201 executing sequences of instructions contained in main memory 202 or ROM 203. Such instructions may be read into memory 202 from another computer-readable medium, such as data storage device 204, or from another source via the network interface 205. Execution of the sequences of instructions causes the processor 201 to analyze the content of the broadcast data, as will be described hereafter. In an alternative embodiment, hard-wired circuitry may be used in place of or in combination with software instructions to implement the present invention. Thus, the present invention is not limited to any specific combination of hardware circuitry and software.

Figure 3:
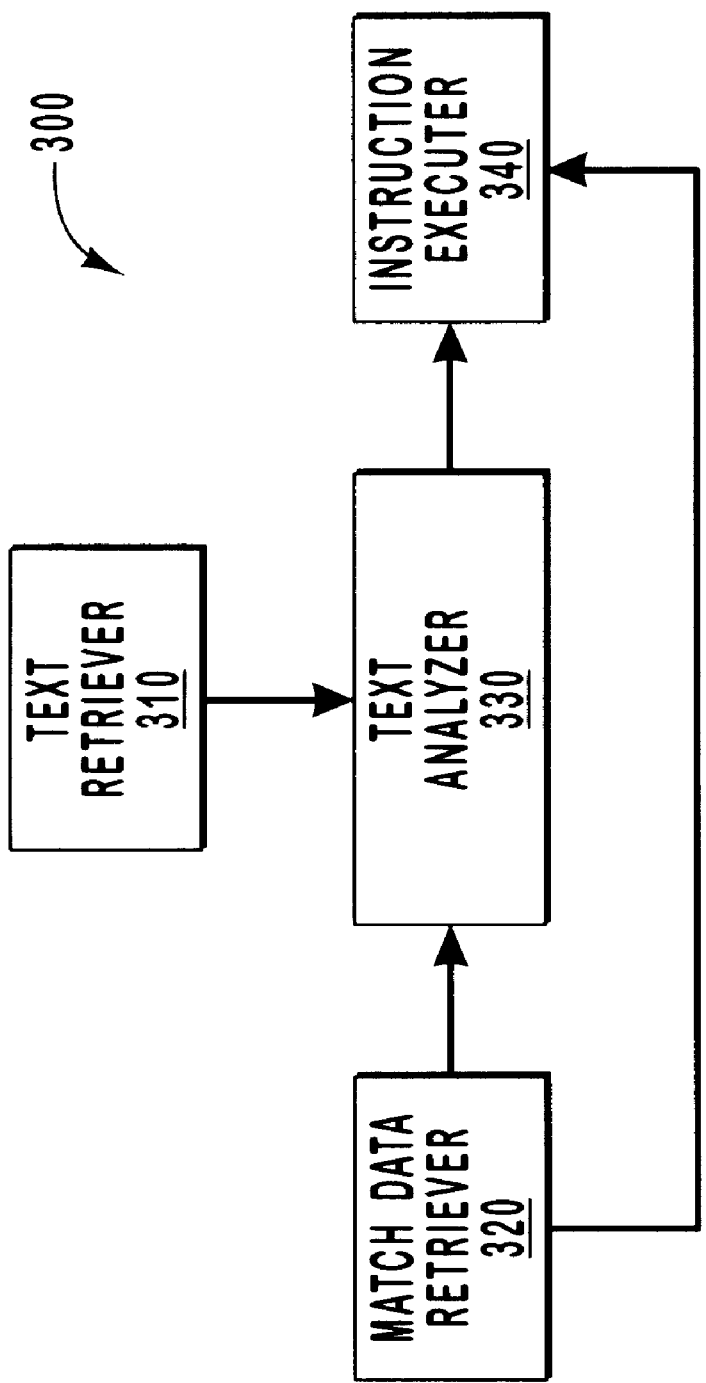
FIG. 3 is a block diagram of modules implementing an embodiment of the present invention.

FIG. 3 is a block diagram showing modules 300 implementing an embodiment of the present invention. In a preferred embodiment of the present invention, the modules are implemented by software and reside in main memory 202 as sequences of instructions. It should be appreciated that the modules may also be implemented by hardware as components coupled to the bus 220 or a combination of both hardware and software.

Block 320 represents a match data retriever. The match data retriever 320 operates to match patterns corresponding to a program that may be broadcasted in the broadcast data. A program in the broadcast data may include a television program or a television commercial for example. According to an embodiment of the present invention, the match data retriever 320 interfaces with the data center 120 (shown in FIG. 1) via the bus 220 (shown in FIG. 2), the network interface 205 (shown in FIG. 2) and the intermediate connection 140 (shown in FIG. 1). The data center 120 provides the match data retriever 320 with the match data. According to an alternate embodiment of the present invention, match data may be obtained by the match data retriever 320 from a computer-readable medium in the data storage device 204 or from other sources.

Figure 4:
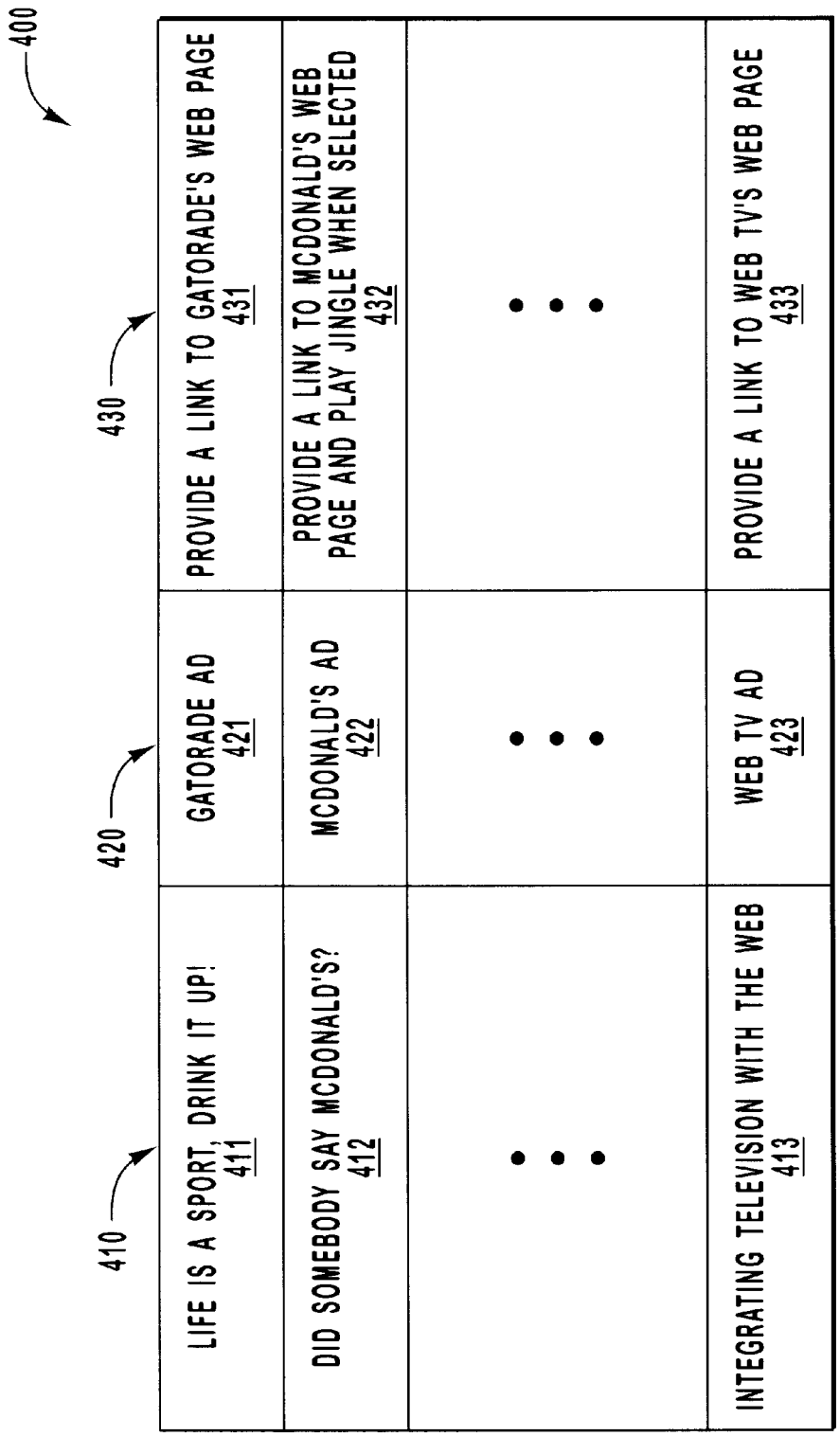
FIG. 4 illustrates an exemplary list of program data according to an embodiment of the present invention.

FIG. 4 illustrates an exemplary embodiment of a list of match data 400 according to an embodiment of the present invention. The list of match data 400 includes a first field 410 that stores key text data, a second field 420 that stores program identifiers, and a third field 430 that stores match instructions. Key text data 411–413 is used by a text analyzer to identify a program in the broadcast data viewed on the client computer system 110 (shown in FIG. 1). The key text data 411–413 may be a string of characters in a word or a string of words that are used in a dialog in a program in the broadcast data. According to an embodiment of the present invention, the key text data 411–413 may also include instructions for executing a program that operates as a decoder for recognizing a string of characters that identify a program in the broadcast data. Program identifiers 421–423 are used to identify a program. The program identifiers 421–423 may be, for example, a name or a number corresponding to the program. Match instructions 431–433 are instructions that are to be performed when a match is found between the key text data and text in the closed captioning data in the broadcast data. The match instructions 431–433 may be, for example, instructions to generate a user selectable identifier on the screen of the display device. That identifier could be used by the user to retrieve data from an HTTP server. The match instructions 431–433 may also contain URLs of specific files to retrieve when a match occurs. It should be appreciated that the list of program data 400 may include fields for storing additional types of program related data and that the list and fields may be of any length.

Referring back to FIG. 3, block 310 represents a text retriever 310. The text retriever 310 operates to obtain closed captioning data from a program being received by the computer system 110. The closed captioning data is retrieved from the video decoder 210 via the video decoder interface 212 and the bus 220. According to an alternate embodiment of the present invention, the text retriever 310 retrieves closed captioning data from the video decoder 210 via the video in DMA engine 211, the bus 220, and another component in the client computer system 110 capable of extracting the closed-captioning text from the digital video stream. According to an embodiment of the present invention, the closed captioning data is retrieved by the text retriever 310 in its ASCII text format.

Block 330 represents a text analyzer. The text analyzer 330 is coupled to the match data retriever 320 and the text retriever 310. The text analyzer 330 receives a list of key text data and program identifiers from the match data retriever 320. The text analyzer 330 includes a plurality of decoders, each recognizing a string of characters corresponding to a different desired match in the broadcast data. The decoders may be software decoders that are programmable to recognize the string of characters in the key text data or the decoders may be actual instructions in the key text data that when executed recognize a string of characters. The text analyzer 330 receives closed captioning data from the text retriever 310 and sends the characters of the text to each of its decoders. When a decoder matches the characters in the closed captioning data with the string of characters in its key text data, the text analyzer generates a message indicating that a program corresponding to a program identifier is being viewed on the client computer system 110.

Block 340 represents an instruction executor. The instruction executor 340 is coupled to the text analyzer 330 and the program data retriever 320. The instruction executor 340 receives program identifiers and corresponding match instructions from the program data retriever 320. When the instruction executor receives a message from the text analyzer 330 indicating that a program corresponding to a program identifier is being viewed, the instruction executor 340 proceeds to execute the match instruction corresponding to that program identifier. The text retriever 310, the program data retriever 320, the text analyzer 330, and the instruction executor 340 may be implemented by any known circuitry or technique.

The present invention allows broadcast data that is being viewed on the client computer system 10 to be monitored for specific content. The present invention is able to determine an identity of a program or the identity of an advertiser so that the client computer system 110 can present additional information corresponding to the program at an appropriate viewing time. By analyzing the closed captioning data in the broadcast data and matching strings of characters in the closed captioning data with strings of characters in key text data corresponding to a known program or source, the present invention is able to determine the identity of a program being viewed.

Figure 5:
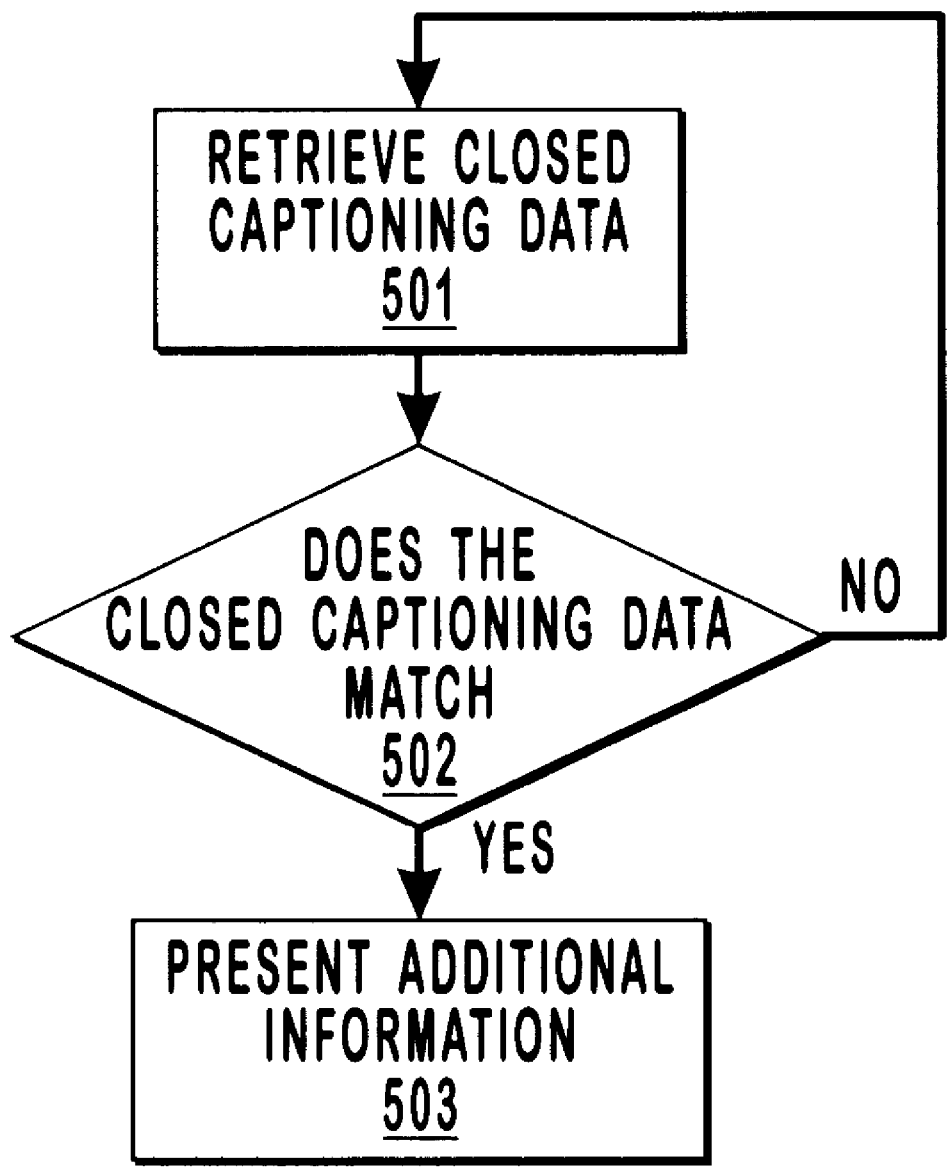
FIG. 5 is a flow chart illustrating a method for managing broadcast data according to an embodiment of the present invention.

FIG. 5 is a flow chart illustrating a method for managing broadcast data according to an embodiment of the present invention. At step 501, closed captioning data is retrieved from broadcast data being viewed. According to an embodiment of the present invention, the closed captioning data is retrieved by decoding the twenty-first line in a VBI in the broadcast data.

At step 502, it is determined whether the text in the closed captioning data matches key text data. If the text in the closed captioning data matches the key text data, control proceeds to step 503. If the text in the closed captioning data does not match the key text data, control returns to step 501. According to an embodiment of the present invention, key text data is a string of characters in a word or a string of words that corresponds to a known program or source. According to an embodiment of the present invention, determining whether the text in the closed captioning data matches the key text data is achieved by sending the text in the closed captioning data through a decoder in a text analyzer that recognizes the characters in the key text data.

At step 503, additional information is presented to the viewer of the broadcast data. According to an embodiment of the present invention, a user-selectable interface is generated that is selectable to retrieve data corresponding to the key text data. The data may be information from a remote HTTP server.

Figure 6:
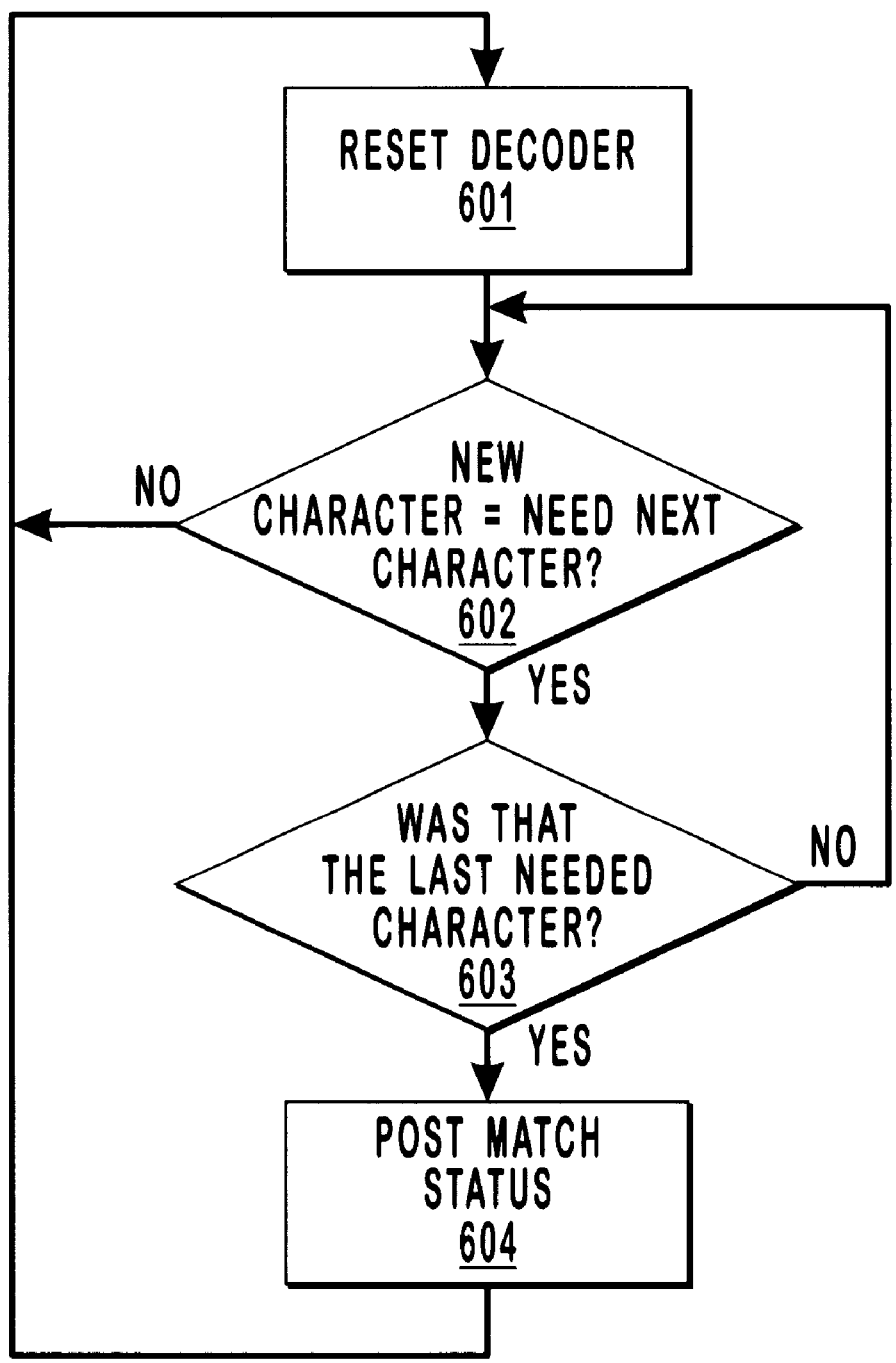
FIG. 6 is a flow chart illustrating a method for determining whether text in closed captioning data matches key text data.

FIG. 6 is a flow chart illustrating a method for determining whether text in closed captioning data matches key text data. According to a preferred embodiment of the present invention, the steps described below are performed by a decoder in a text analyzer that is programmed to recognize a string of characters corresponding to a specific program. It should be appreciated that a plurality of decoders may reside in the text analyzer. At step 601, the decoder is reset.

At step 602 it is determined whether a new character received from the closed captioning data matches a next needed character. A needed character is defined as a character in the key text data that is required for a match. If the new character received from the closed captioning data matches the next needed character, control proceeds to step 603. If the new character received from the closed captioning data does not match the next needed character, control proceeds to step 601.

At step 603, it is determined whether the character matched was the last needed character. If the character matched was the last needed character, control proceeds to step 604. if the character matched was not the last needed character, control returns to step 602.

At step 604, a match is posted to the system to indicate that the closed captioning data matches the key text data. Control returns to step 601.

In the foregoing specification, the invention has been described with references to specific embodiments thereof. It will, however, be evident that various modifications and changes may be made thereto without departing from the broader spirit and scope of the invention. The specification and the drawings are, accordingly, to be regarded in an illustrative rather than a restrictive sense.

What is claimed is:

1. In a client computer system that is capable of both communicating with at least one server computer system and receiving broadcast data from a broadcast data source, a method of analyzing the broadcast data to present to a viewer additional information relating to a program included in the broadcast data, the method comprising:

receiving broadcast data that includes closed captioning data and a program;

decoding the closed captioning data;

accessing a list of key text data including key text data entries that reference additional data corresponding to programs based on closed captioning data associated with the programs;

comparing text included in the decoded closed captioning data with the list of key text data and determining that the text matches a particular key text data entry; and based on the determination that the text matches the particular key text data entry, presenting to the viewer additional information that is referenced by the particular key text data entry and that corresponds to the program included in the received broadcast data.

2. The method of claim 1, wherein decoding the closed captioning data comprises decoding a twenty-first line in a vertical blanking interval in the broadcast data.

3. The method of claim 1, wherein comparing text included in the closed captioning data comprises sending the closed captioning data through a text analyzer that recognizes the key text data of the particular key text data entry.

4. The method of claim 1, wherein accessing the list of key text data comprises the step of receiving the list of key text data from a remote computer system.

5. The method of claim 4, further comprising the step of programming a text analyzer at the client computer system to recognize the key text data of the particular key text data entry.

6. The method of claim 1, wherein presenting to the viewer additional information comprises the step of generating a user-selectable interface that is selectable to retrieve said additional information from one of the at least one server computer system.

7. A computer-readable medium having stored thereon sequences of instructions that, when executed by a processor of a client computer system, cause the processor to perform a method of analyzing broadcast data to present to a viewer additional information relating to a program included in the broadcast data, the method comprising the steps of:

decoding closed captioning data from broadcast data that has been received at the client computer system and includes the closed captioning data and a program;

accessing a list of key text data including key text data entries that reference additional data corresponding to programs based on closed captioning data associated with the programs;

comparing text included in the decoded closed captioning data with the list of key text data and determining that the text matches a particular data matches key text data entry; and based on the determination that the text matches the particular key text data entry, presenting to the viewer additional information that is referenced by the particular key text data entry and that corresponds to the program included in the received broadcast data.

8. The computer-readable medium of claim 7, wherein decoding the closed captioning data comprises decoding a twenty-first line in a vertical blanking interval in the broadcast data.

9. The computer-readable medium of claim 7, wherein decoding the closed captioning data comprises accessing a video decoder of the client computer system.

10. The computer-readable medium of claim 7, wherein comparing text included in the closed captioning data comprises sending the closed captioning data through a text analyzer that recognizes the key text data of the particular key text data entry.

11. The computer-readable medium of claim 7, wherein accessing the list of key text data comprises the step of receiving the list of key text data from a remote computer system.

12. The computer-readable medium of claim 7, wherein the method further comprises the step of programming a text analyzer to recognize the key text data of the particular key text data entry.

13. The computer-readable medium of claim 7, wherein presenting to the view additional information comprises the step of generating a user-selectable interface that is selectable to retrieve said additional information from a server computer system.

14. In a client computer system that is capable of both communicating with at least one server computer system and receiving broadcast data from a broadcast data source, a method of analyzing the broadcast data to present to a viewer additional information relating to a program included in the broadcast data, the method comprising:

accessing a list of key text data having at least one key text data entry, wherein each key text data entry:

identifies a program included in broadcast data based on closed captioning data that is transmitted simultaneously in the broadcast data with the program; and references instructions that, when executed by the client computer system, enable a viewer to obtain to additional information corresponding to the program identified by the key text data entry;

receiving broadcast data that includes closed captioning data and a program;

decoding the closed captioning data;

comparing text included in the decoded closed captioning data with the list of key text data and determining that the text matches a particular key text data entry; and executing the instructions referenced by the particular key text data entry and, upon executing the instructions, presenting to the viewer a link that, when selected by the viewer. causes the additional information corresponding to the program to be retrieved from one of said at least one server computer system.

15. The method of claim 14, wherein decoding the closed captioning data comprises decoding a twenty-first line in a vertical blanking interval the broadcast data.

16. The method of claim 14, wherein the step of accessing the list of key text data comprises the step of receiving the list of key text data from a remote data center that is connected with the client computer system.

17. The method of claim 14, wherein the step of accessing the list of key text data comprises retrieving the list of key text data from a data storage device included in the client computer system.

18. The method of claim 14, wherein the program included in the broadcast data is an advertisement, and wherein the additional information comprises information relating to an advertiser associated with the advertisement.

19. The method of claim 14, wherein the additional information is retrieved from an HTML file at said one server computer system.

* * * * *

UNITED STATES PATENT AND TRADEMARK OFFICE
CERTIFICATE OF CORRECTION

PATENT NO. : 6,141,678
DATED : October 31, 2000
INVENTOR(S) : Joe F. Britt Jr.

It is certified that error appears in the above-identified patent and that said Letters Patent is hereby corrected as shown below:

Column 2,
Line 18, after "computer" change "system" to -- systems --
Line 19, after "server computer" change "system" to -- systems --

Column 3,
Line 26, after "input device to" change "a" to -- an --
Line 50, after "system" change "10" to -- 110 --

Column 8,
Line 12, after "matches a particular" delete "data matches"

Column 9,
Line 4, before "causes the additional" change "viewer." to -- viewer, --
Line 9, after "blanking interval" insert -- in --

Signed and Sealed this

Fourth Day of December, 2001

Attest:

NICHOLAS P. GODICI
Attesting Officer    Acting Director of the United States Patent and Trademark Office